(12) United States Patent
Eshwar et al.

(10) Patent No.: US 8,341,285 B2
(45) Date of Patent: Dec. 25, 2012

(54) METHOD AND SYSTEM FOR TRANSFERRING FILES

(75) Inventors: Sathya Sai Eshwar, Bangalore Karnataka (IN); Dipu Sreekumaran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 12/242,714

(22) Filed: Sep. 30, 2008

(65) Prior Publication Data

US 2009/0106260 A1 Apr. 23, 2009

(30) Foreign Application Priority Data

Oct. 22, 2007 (IN) .......................... 2383/CHE/2007

(51) Int. Cl.
*G06F 15/16* (2006.01)
(52) U.S. Cl. ........................................................ 709/232
(58) Field of Classification Search .................... 709/232
See application file for complete search history.

(56) References Cited

U.S. PATENT DOCUMENTS

| 7,016,967 | B2 | 3/2006 | Mori |
| 7,107,351 | B2 | 9/2006 | Baumeister |
| 2002/0078174 | A1* | 6/2002 | Sim et al. ...................... 709/219 |
| 2005/0044250 | A1 | 2/2005 | Gay |
| 2008/0300931 | A1* | 12/2008 | Dawson et al. ................... 705/7 |

\* cited by examiner

*Primary Examiner* — Hussein Elchanti
*Assistant Examiner* — Maceeh Anwari

(57) ABSTRACT

The present invention proposes an apparatus and a method to efficiently transfer large files by splitting the file into smaller portions which may be transferred through a plurality of recipient nodes to a terminal node. The portion of file to be transferred by each recipient node is decided based on a load sharing algorithm. The terminal node may gather the current specifications of the recipient nodes and compute the portion of file each needs to transfer. The source node will get parallel requests from plurality of recipient nodes to transfer different offsets of the same file. The file splits across various nodes may be later merged locally.

21 Claims, 6 Drawing Sheets

METHOD AND SYSTEM FOR TRANSFERRING FILES

RELATED APPLICATIONS

This patent application claims priority to an Indian patent application with serial number 2383/CHE/2007, having title "A Method and System for Transferring Files", filed on 22 Oct. 2007 in India (IN), commonly assigned herewith, and hereby incorporated by reference.

BACKGROUND OF THE INVENTION

Leading market, business, social and technical indicators point to the growing importance of digitally recorded content. In 2003, media data, such as images, motion pictures, voice, audio, and video, eclipsed structured data in sheer volume.

One of the key problems with media data is transferring the often huge files through a network. Normally, a large file is transferred so that the complete content is transferred before anything is done with the data. A prominent implementation of this paradigm is the File Transfer Protocol (FTP), the standard way to transfer files throughout the World Wide Web.

FTP is a commonly used protocol for exchanging files over any network that supports TCP/IP. FTP is most commonly used to download a file from a server using the Internet or to upload a file to a server for example, uploading a Web page file to a server. With the manual transportation & delivery cost of physical media, such as tape, being high, conventional FTP is increasingly being used to achieve the same for media data, such as images, motion pictures, voice, audio, and video over the available computer networks due to its low cost.

Conventional FTP works well if the size of the file to be transferred is comparatively small. But when very large files need to be transferred using FTP, it can take long time to transfer the file.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
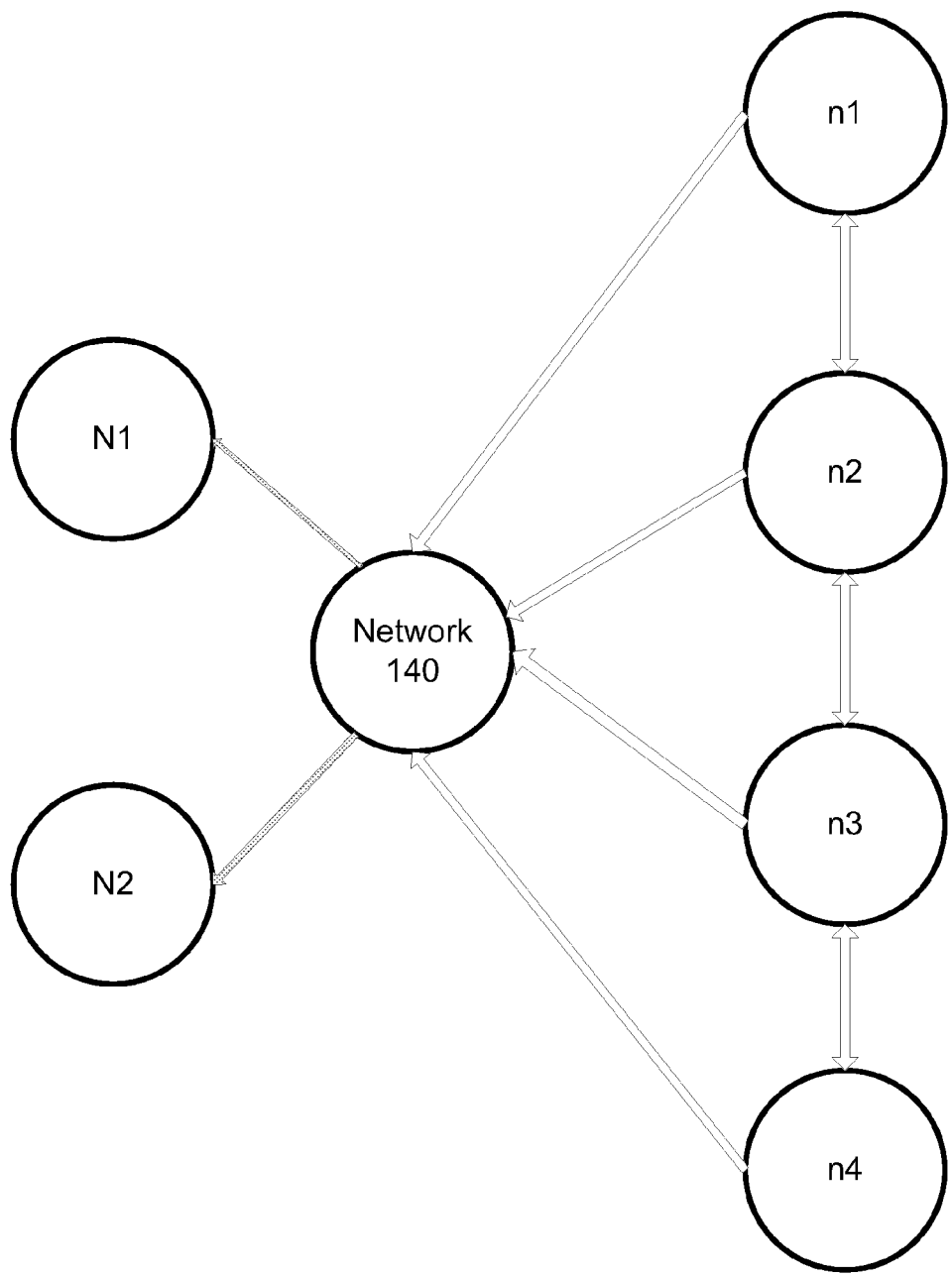
FIG. 1 is a diagram showing an example of an environment in which the present invention may be implemented.

FIG. 1 is a diagram showing the details of an example environment in which the present invention may be implemented. The block diagram is shown containing clients computers n1 through n4, network 140, and server computers N1 and N2. The server computer may be a file transfer protocol (FTP) server, for example connected to client computers n1 through n4 though a wide area network, such as the public Internet. The server computer, which will also be referred to as the "source node" in the following description, may act as a repository for the files. The client computers may be connected to each other via a network, for example a high speed local area network (LAN). The client computers will also be referred to as "nodes" in the following description.

It should be understood that only representative example components are shown in the diagram so as not to obscure various features of the present invention. However, it will be apparent to one skilled in the relevant arts that environments may contains many other (both in number and type) components implemented, without departing from the scope and spirit of various aspects of the present technique.

Network 140 may provide connectivity between client nodes n1 through n4 and server nodes N1 and N2. Network 140 may comprise several devices for example, bridges, routers, modems, communication links, etc., operating according to protocols such as TCP/IP well known in the relevant arts. However, other forms (e.g., point-to-point private network using proprietary protocols or ATM-based network) may also be used to provide connectivity between the client computer and the server system.

Nodes n1 through n4 enable users to store and/or retrieve file into or from servers N1 and N2. For the purposes of illustration, it is assumed that user applications supported by node n1 may need to store and/or retrieve file from server N1. However, node n1 may access other servers (not shown) and other nodes (n2 through n4) may also access server N1 in a similar manner.

In order to store and/or retrieve file into or from a server node, a connection is established from a user application to a server, and then calls are generated by applications to perform desired operations. The calls are transmitted on network 140 and corresponding responses are received from the server.

Figure 2:
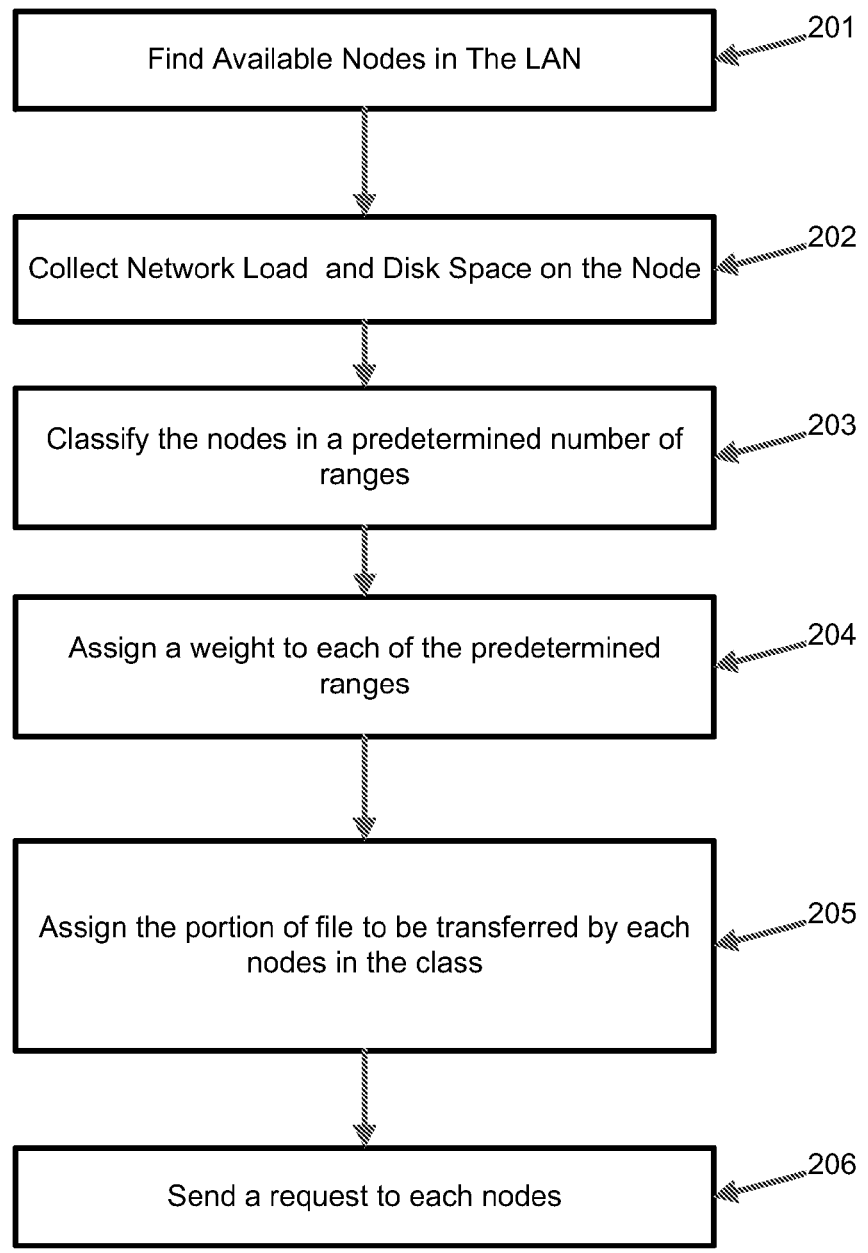
FIG. 2 is a diagram showing the steps of an algorithm for downloading a file from a source node.

FIG. 2 illustrates an algorithm for transferring files from a server node to a client node. The file transfer may be initiated from one or more of the client nodes in a network. The algorithm for transferring the file is invoked when one of the client nodes gets a request to transfer a file from the server node by user applications running on the same. The node initiating the file transfer will also be referred to as the "terminal node" and/or "master node" in the following description.

At step 201 of FIG. 2, the terminal node may determine the available nodes in the network. All the available nodes in the network other than the terminal node will be referred to as "recipient nodes" in the following description. Continuing to step 202, the terminal node may obtain capacity information concerning the capacity of the recipient nodes in order to determine the portions of the file to be obtained by each recipient node according to the capacity information.

The capacity information may comprise network load, disk space on the recipient nodes, for instance. Based on the information received, the terminal node may split the file to be transferred across the plurality of recipient nodes in the network. The file may be split across the plurality of recipient nodes based on the load sharing algorithm which will be discussed below.

Further continuing to Step 203 of FIG. 2, the recipient nodes in the network are classified into predetermined number of classes based on the capacity information. The predetermined classes may depend on the number of recipient nodes available in the network, the network load on the recipient nodes, the disk space on the recipient nodes, the processor speed of the recipient nodes, the network connection at the recipient nodes, for instance.

At step 204 of FIG. 2, each of the predetermined classes is assigned a weight. The assigned weight may depend on the processing load on the member recipient nodes in the class, the network load on the member recipient nodes of the class, for instance. As an example the weight of the predetermined classes may be assigned depending only on network load on the member recipient nodes of the predetermined class.

According to an embodiment the steps for assigning a weight for a predetermined class may comprise: collecting the current network load on each of the nodes; and converting the network load value to a measure of availability of the node.

Continuing to step 205, the portion of the file to be transferred by each of the member recipient nodes of the predetermined classes is calculated. The algorithm for calculating the portion of the file to be transferred by each of the predetermined class will be discussed with reference to FIG. 4.

At Step 206 of FIG. 2 the terminal node may send a request to the plurality of recipient nodes for establishing a network connection with the source node for the file transfer session. The terminal node will inform recipient nodes on the portion of the file (starting and ending offset) each of the recipient nodes needs to transfer from the source node.

Figure 3:
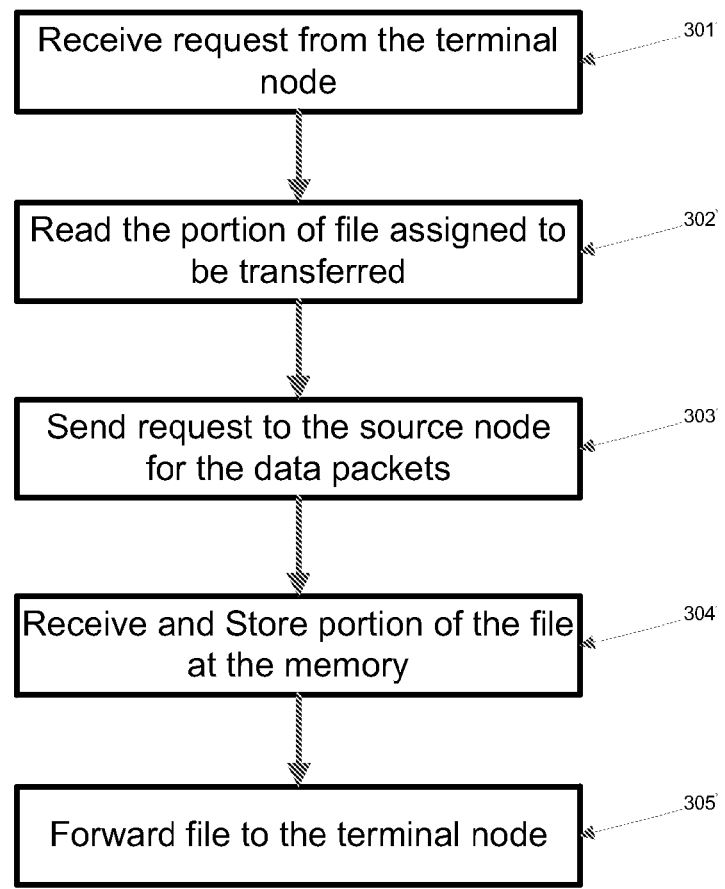
FIG. 3 is a flow chart illustrating the steps involved in forming a file transfer pipeline.

FIG. 3 illustrates steps used during the establishment of the proposed network connection for transferring a file. At step 301 of FIG. 3, the recipient nodes may receive a request from the terminal node. The request may comprise network setup and file setup information. The file setup information preferably may include the name of the file being transferred, and the size of the block to be transferred and the address of the source node. Other information may be included in the request, in various implementations including public signature keys if the portions of the file have been signed by the source and checksum information if error correction or detection has been applied. After the file setup has been received, the method proceeds to step 302 to determine the size of the portion of the file to be transferred.

Continuing at Step 303, a plurality of the recipient nodes may, in parallel, set-up network connections with the source node and may each send a request for the portion of the file to be transferred through them. The source node may concurrently receive such request from a plurality of recipient nodes in the network for the same file, but for a different portion, and may start transferring the requested data packets to the plurality of recipient nodes. Thus the file is transferred from the source node to the plurality of recipient nodes in parallel. The parallel transfer of file may reduce the time required for downloading a file from a source node. The parallel transfer also may ensure the effective utilization of the available resources in a network for downloading a file.

Further continuing to step 304 of FIG. 3, each recipient node may receive requested data packets from the source node and store them locally in the available storage device. At Step 305, the data packets received from the source node stored locally within each recipient node may be forwarded to the terminal node. The portion of the file stored at each recipient node may be forwarded to the terminal node through a preconfigured communication channel or existing network connection. In one embodiment the recipient node may continuously forward the received data packets in case of insufficient storage space at the node. In another embodiment the recipient node may forward the data packets to the terminal node after the completion of the download of the assigned portion of the file. The recipient nodes may further notify the terminal node of the completion of the transfer of the portion of file assigned to them.

Figure 4:
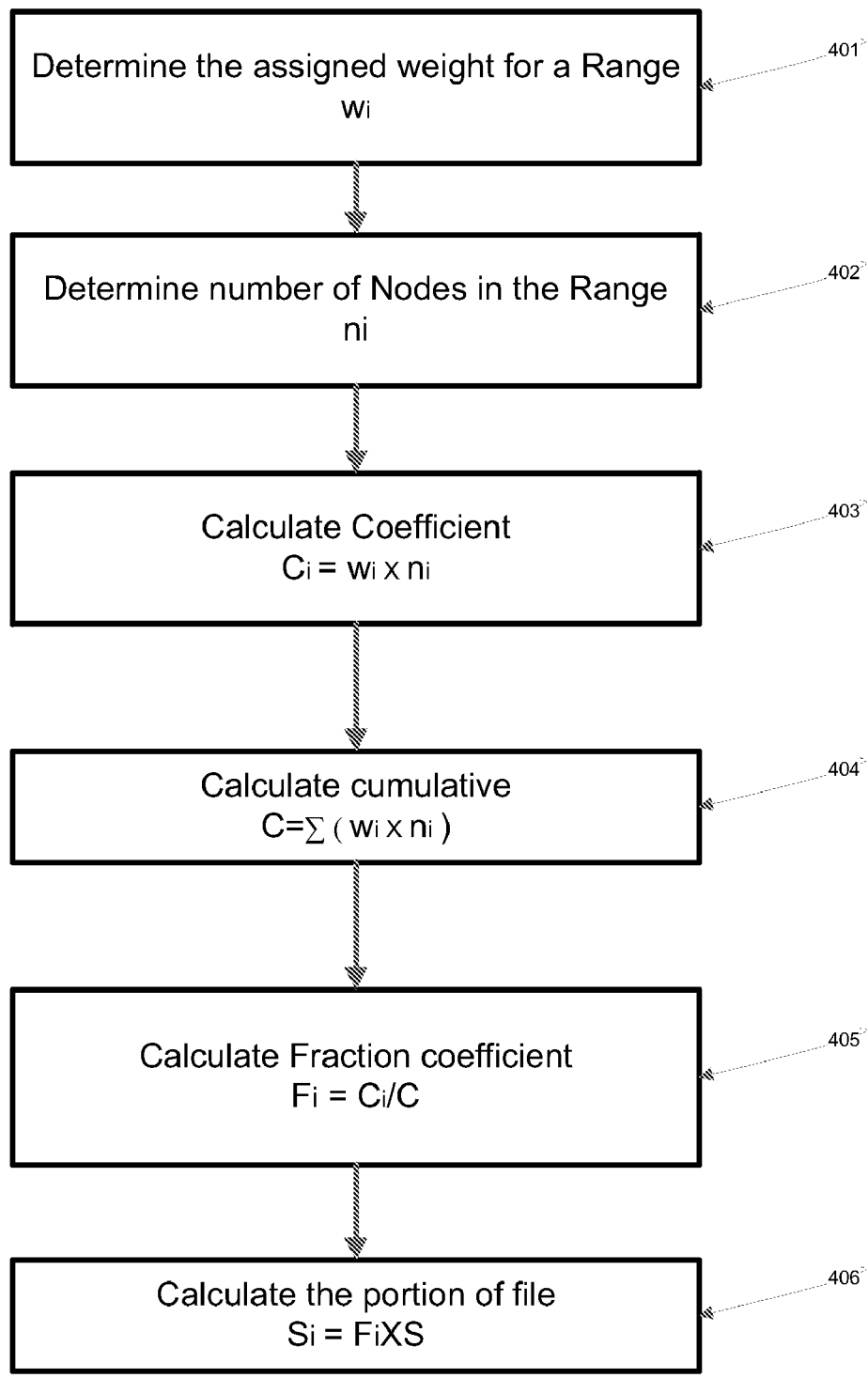
FIG. 4 is a flow chart illustrating the steps involved in an algorithm for calculating the portion of the file to be downloaded by each node in local area network.

FIG. 4 illustrates the steps of the algorithm for calculating the portion of the file to be assigned to each of the recipient nodes for transfer from the source node. As stated above with respect to step 203 and step 204 of FIG. 2, the recipient nodes are classified into a predetermined number of classes ($R_i$) based on the capacity information and each of the predetermined class ($R_i$) is assigned a weight ($W_i$). The suffix i denotes the ith member of N member group.

At step 403, for each of the predetermined class ($R_i$), a coefficient is calculated by multiplying the assigned weight of the class by the total number of recipient nodes in the class. The coefficient ($C_i$) of ith class may be calculated by multiplying the assigned weight of ith class ($W_i$) with the number of recipient nodes ($n_i$) in the ith class.

$$C_i = W_i \times n_i$$

Continuing to step 404, a cumulative coefficient is calculated for the predetermined classes by adding the individual coefficients of each of the predetermined class. The cumulative coefficient C may be calculated by aggregating the coefficient $C_i$ of each of the predetermined number of classes. The cumulative coefficient also represented by C can be calculated as $$C = \sum_{i=1}^{i=n} [w_i \times n_i]$$

where n is the total number of the predetermined classes.

Further continuing to step 405 of FIG. 4, a fraction coefficient of for each of the predetermined classes is calculated by dividing the coefficient of a class by the cumulative coefficient. The fraction coefficient for the ith class ($F_i$) may be calculated by dividing the coefficient of the ith class ($C_i$) with the cumulative coefficient (C). Thus $$F_i = C_i / C$$

At Step 406 of FIG. 4, the portion of the file to be transferred through member nodes of a predetermined class is calculated by multiplying the fraction coefficient of the class with the total size of the file to be transferred. For the ith class, the portion of the file to be transferred by the member nodes of a class ($S_i$) may be calculated by multiplying the fraction coefficient of the ith class ($F_i$) with the total size of the file to be transferred (S). Thus $$S_i = F_i \times S$$

The portion of the file to be transferred through each of the member nodes of a class may be calculated by dividing the portion of the file to be transferred through the member nodes of the class by the number of the member nodes in the class. For the ith class the portion of the file to be transferred through the member nodes is given by ($S_i/n_i$) wherein $S_i$ is the portion of the file to be transferred through member nodes of the ith class and $n_i$ is the number of the member nodes of the ith class.

According to an embodiment, if a recipient node does not have sufficient memory available to store the assigned portion of the file to be transferred to it, the node may be reclassified into another class.

The algorithm illustrated in FIG. 4 will now be further described with reference to an example. The table given below is a hypothetical example of a FTP network with 20 recipient nodes connected to each other through a Local Area Network (LAN). For simplicity, the 20 recipient nodes of the LAN are divided into 4 classes depending on the network load on each of the nodes. Each of the above identified classes is assigned a weight depending on the network load. As illustrated in the Table 1, the 20 recipient nodes are categorized into four classes with network loads of 0-25, 25-50, 50-75 and 75-100, respectively. Accordingly, depending on the network load each of the above mentioned classes is assigned a weight of 10, 20, 30 and 40 respectively. The classes with high network load may be assigned a low weight and a class with low network load may be assigned a high weight.

TABLE 1

| CLASS (Ri) | NETWORK LOAD | WEIGHT (Wi) | NUMBER OF RECIPIENT NODES (ni) |
|---|---|---|---|
| R1 | 0-25 | (10) | 10 |
| R2 | 25-50 | (20) | 01 |
| R3 | 50-75 | (30) | 07 |
| R4 | 75-100 | (40) | 02 |

As illustrated above in Table 1, classes R1, R2, R3 and R4 have 10, 1, 7 and 2 recipient nodes respectively.

The coefficient of the class is calculated by multiplying the assigned weight of each class with the number of member nodes available in that class. Thus the coefficient of the classes may be calculated as $C1 = (10*10 = 100)$ $C2 = (01*20 = 20)$ $C3 = (07*30 = 210)$ $C4 = (02*40 = 80)$ The cumulative coefficient of the LAN may be calculated by aggregating the individual coefficient of the each of the predetermined classes. The cumulative coefficient of the LAN may be calculated as $$C = 100 + 20 + 210 + 80$$
$$= 410$$

The fraction coefficient of each of the predetermined class may be calculated by dividing the coefficient of a class by the cumulative coefficient. Thus the fraction coefficients may be calculated as $F1 (100/410 = 0.24)$ $F2 (20/410 = 0.05)$ $F3 (210/410 = 0.51)$ $F4 (80/410 = 0.20)$ If the total size of the file to be transferred is 100 GB, the portion of the file to be transferred through each class may be calculated as:

$R1 (0.24 \times 100 = 24)$ $R2 (0.05 \times 100 = 05)$ $R3 (0.51 \times 100 = 51)$ $R4 (0.20 \times 100 = 20)$ The portion of the file to be transferred by the 10 recipient nodes in class R1 will transfer 24 GB. Thus each recipient node in class R1 will transfer 2.4 GB. Similarly the recipient node in class R2 will transfer 5 GB and so on.

Figure 5:
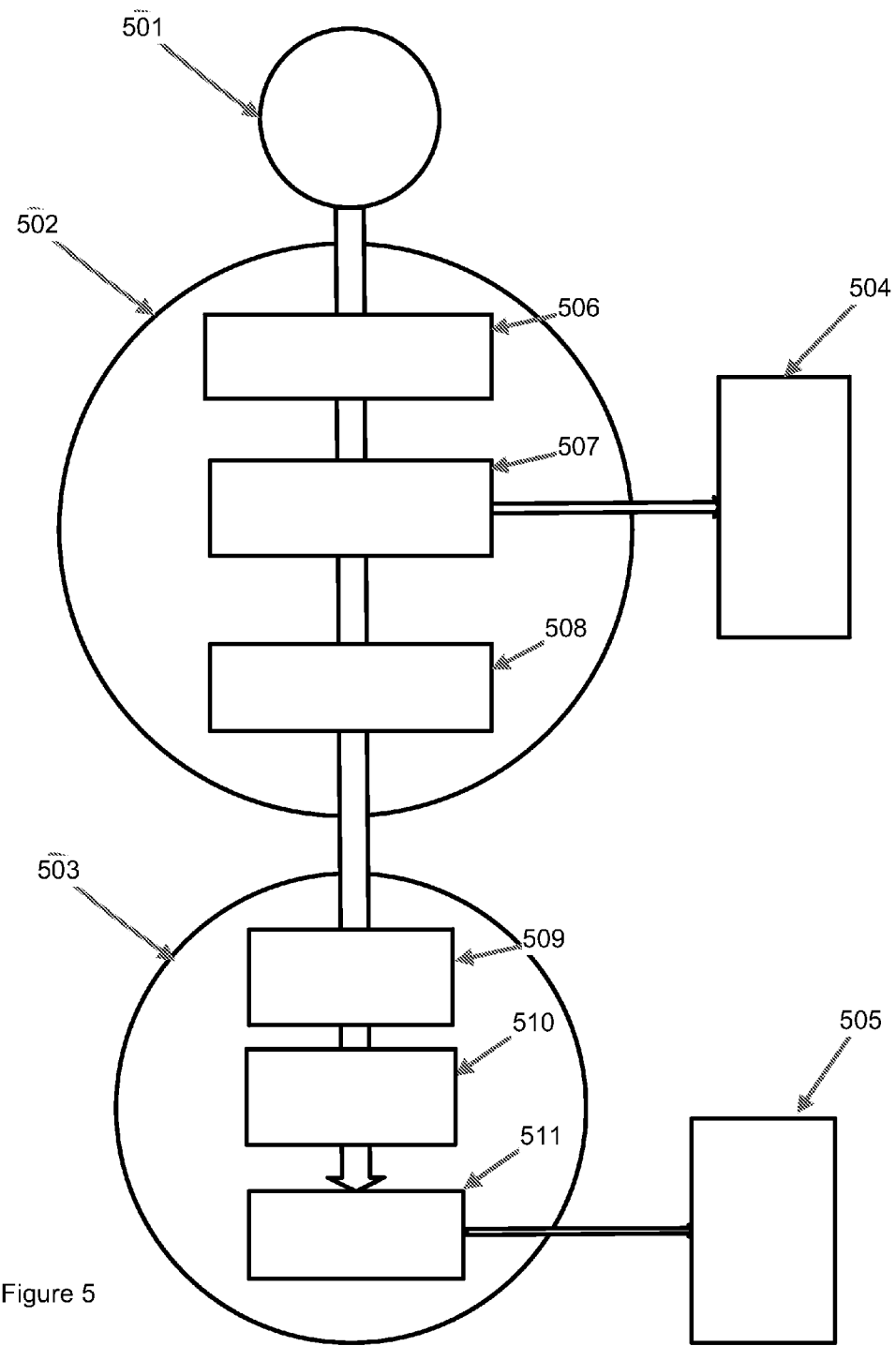
FIG. 5 is a diagram showing exemplary architecture of a recipient node 502 and terminal node 503 arranged to implement the present technique.

FIG. 5 illustrates an exemplary architecture of a recipient node 502 and terminal node 503 arranged to implement the present technique. Each recipient node 502 has functionality for receiving a request 508 from the terminal node 503 for transfer of a respective portion of the file from the source node 501; functionality for setting up a connection to the source node 501 and receiving their respective portion of the file; and functionality for forwarding 507 the portion of the file received to the terminal node. A recipient node may comprise of a storage device 504 connected to it for storing the portion of the file received from the source node 501. Each recipient node 502 preferably has a behaviour that defines how packets are routed to the terminal node 503.

The terminal node 503 may comprise functionality for sending a request 509 from the terminal node 503 to each of a plurality of recipient nodes 502 to request transfer of a respective portion of the file from the source node; functionality for receiving 510 the portions of the file from the recipient nodes; functionality for assembling 511 the portion of the file received from the plurality of recipient nodes. The terminal node 503 may comprise a storage device 505 for storing the file received from the source node 501.

Upon receipt of a network setup operator from the terminal node, the recipient node may enter a network setup state. The network setup state is maintained until a file transfer is ready. When the terminal node has received confirmation from the recipient node that the network setup has been fully established, the source sends a file setup operator to the recipient nodes. The file setup operator preferably includes the size of the portion of the file, the file size (either in absolute terms or as a number of data units) etc. The file setup operator places the node into a file setup state while it prepares for the file transfer. The file setup state is maintained until the node begins receiving file portions. Upon receipt of the portion of the file, the recipient node may forward the portion of the file to the terminal node.

Figure 6:
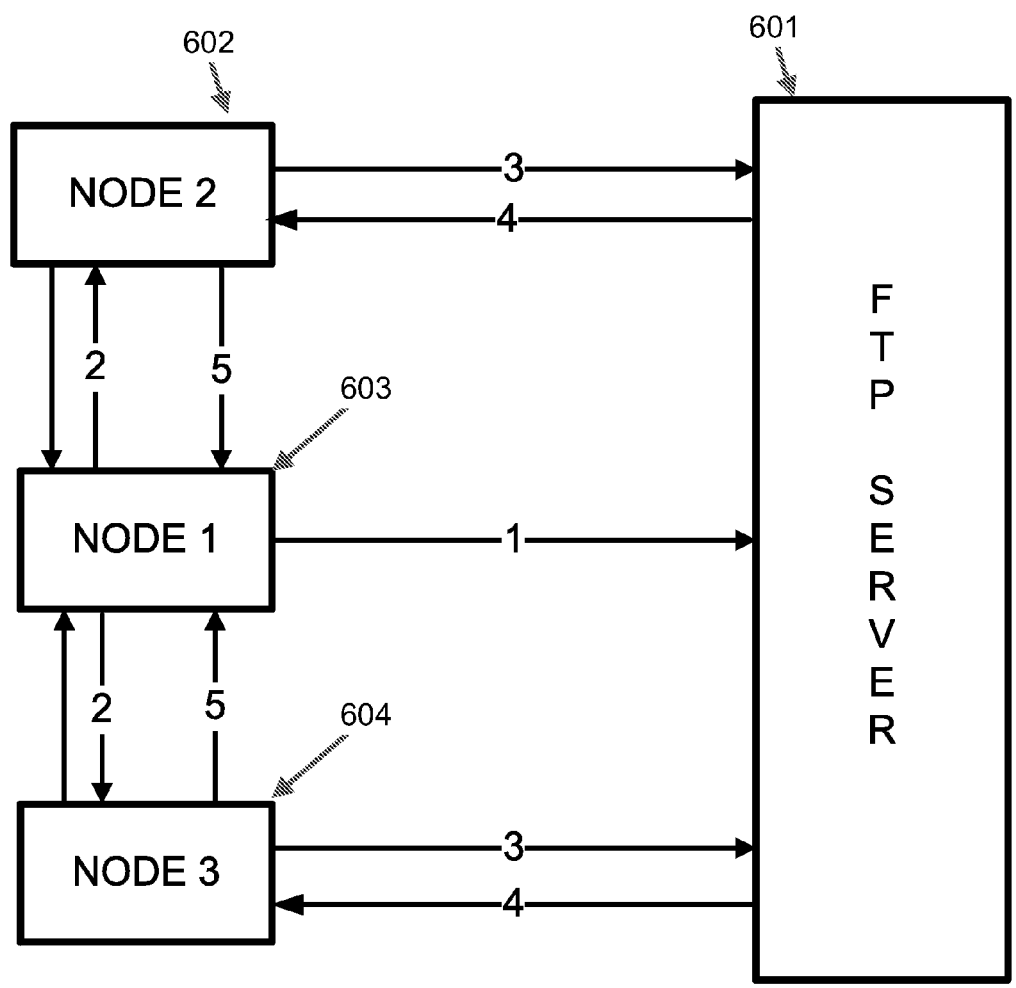
FIG. 6 is a diagram illustrating an example of working of present invention.

FIG. 6 illustrates the working of the above mentioned technique as an example, in a three node LAN environment connected to an FTP server through the internet. As illustrated in FIG. 6, the LAN comprises three nodes NODE 1 603, NODE 2 602 and NODE 3 604 connected to a FTP server 601. The user may initiate a file transfer from the FTP server 601 through NODE 1 603. NODE 1 603 in the LAN may initiate the FTP session with FTP server 601 to download a file. NODE 1 603 then may determine the size of the file requested for the transfer from the FTP server 601. Depending on the size, the requested file may be categorized as large by the NODE 1 603. If the size of file to be transferred is categorized as large, NODE 1 603 now becomes as a master node for the file transfer session. NODE 1 603 now may check for the availability of other nodes in the same LAN. Based on the availability, NODE 1 603 may send a query for other attributes on the identified available nodes such as availability of the node, current network traffic and disk space available on the node. NODE 2 602 and NODE 3 604 then may respond to NODE 1 603 with the requested attributes. NODE 1 603 may compute the size of the portion of file which NODE 2 602 and NODE 3 604 need to download based on the load sharing algorithm discussed above. NODE 1 603 then may send a request packet to NODE 2 602 and NODE 3 604 which comprises instructions to download the specific portion of the file from the FTP server 601. NODE 2 602 and NODE 3 603 each initiate an FTP session with the FTP server 601 for downloading a requested portion of the file. FTP server 601 responds back with that specific portion of the file to NODE

2 602 and NODE 3 604 respectively. The portion of the file thus downloaded by NODE 2 602 and NODE 3 604 may then be forwarded to NODE 1 603. NODE 1 603 may locally merge the portion of file.

In general the above approach for transferring large files using multiple nodes has advantages of parallel transfer of file which may result in faster file transfers. The method is transparent to the server and it does not involve any change in the current server setup.

The present invention can be realized in hardware, software, or a combination of hardware and software. Any kind of computer system or other apparatus including a processing circuit for carrying out the methods described herein is suited. A typical combination of hardware and software could be a general purpose computer system with a computer program that, when being loaded and executed, controls the computer system such that it carries out the client or server specific steps of the methods described herein.

The present invention can also be embedded in a computer program product, which comprises all the features enabling the implementation the respective steps of the methods described herein, and which—when loaded in one or more computer systems—is able to carry out these methods.

Computer program means or computer program in the present context mean any expression, in any language, code or notation, of a set of instructions intended to cause a system having an information processing capability to perform a particular function either directly or after either or both of the following; (1) conversion to another language, code or notation, or (2) reproduction in a different material form.

While the preferred embodiment of the invention has been illustrated and described herein, it is to be understood that the invention is not limited to the precise construction herein disclosed. The invention is only limited by the scope of the appended claims.

The invention claimed is:

1. A method of transferring a file from a source node to a terminal node comprising:
    obtaining, by the terminal node, capacity information concerning capacities of corresponding ones of a plurality of recipient nodes, wherein the capacity information includes available storage space in corresponding ones of the plurality of recipient nodes;
    determining a corresponding portion of the file to be obtained by each of the recipient nodes according to the capacity information;
    sending a request from the terminal node to each of the plurality of recipient nodes to request transfer of the respective determined portion of the file from the source node;
    receiving, by the terminal node from the plurality of recipient nodes, respective portions of the file obtained by the respective recipient nodes from the source node; and
    assembling the portions of the file received from the plurality of recipient nodes at the terminal node.

2. The method as claimed in of claim 1 wherein the recipient nodes are to receive the obtained portions of the file from the source node over a wide area network, and wherein the terminal node receives the obtained portions over a Local Area Network.

3. The method of claim 1, wherein the source node is a File Transfer Protocol (FTP) server and each of the plurality of recipient nodes is to set up a respective connection to the source node using the File Transfer Protocol.

4. The method of claim 1, comprising the terminal node obtaining the capacity information by sending a status request to each of the recipient nodes and the terminal node receiving a status response from each of the recipient nodes.

5. The method of claim 1 wherein the capacity information further comprises a network load of each of the recipient nodes.

6. The method of claim 1 wherein the capacity information further comprises a processor speed of each of the recipient nodes.

7. The method of claim 1, wherein the terminal node receives the respective obtained portion from a particular one of the recipient nodes at a preconfigured time or frequency.

8. The method of claim 7, wherein the preconfigured time or frequency is dependent on the storage space available at the particular recipient node.

9. The method of claim 1, further comprising:
    identifying multiple classes of the recipient nodes, where each class is dependent on the storage space of the recipient nodes in the respective class, and the network load of the recipient nodes in the respective class,
    wherein determining the corresponding portion of the file to be obtained by each of the recipient nodes comprises determining an aggregate portion of the file to be obtained by recipient nodes in a particular one of the multiple classes.

10. The method of claim 9, further comprising:
    dividing the aggregate portion by a number of the recipient nodes in the particular class to determine a size of the portions of the file to be obtained by respective ones of the recipient nodes in the particular class.

11. A terminal node arranged to obtain a file from a source node, the terminal node comprising:
    a processing circuit to:
        obtain capacity information concerning capacities of corresponding ones of a plurality of recipient nodes, wherein the capacity information includes available storage space in corresponding ones of the recipient nodes;
        determine a corresponding portion of the file to be obtained by each of the recipient nodes according to the capacity information;
        send a request to each of the recipient nodes to request transfer of the respective determined portion of the file from the source node;
        receive, from the recipient nodes, respective portions of the file obtained by the respective recipient nodes from the source node; and
        assemble the portions of the file received from the recipient nodes.

12. The terminal node of claim 11, wherein the processing circuit is to obtain the capacity information by sending a status request to each of the recipient nodes and receiving a status response from each of the recipient nodes.

13. The terminal node of claim 11, wherein the capacity information further comprises a network load of each of the recipient nodes.

14. The terminal node of claim 11, wherein the capacity information further comprises a processor speed of each of the recipient nodes.

15. The terminal node of claim 11, wherein the terminal node is to receive the respective portion from a particular one of the recipient nodes at a preconfigured time or frequency.

16. The terminal node of claim 15, wherein the preconfigured time or frequency is dependent on the storage space available at the particular recipient node.

17. The terminal node of claim 11, wherein the processing circuit is to further:

identify multiple classes of the recipient nodes, where each class is dependent on the storage space of the recipient nodes in the respective class, and the network load of the recipient nodes in the respective class, wherein determination of the corresponding portion of the file to be obtained by each of the recipient nodes comprises determining an aggregate portion of the file to be obtained by recipient nodes in a particular one of the multiple classes.

18. The terminal node of claim 17, wherein the processing circuit is to further:

divide the aggregate portion by a number of the recipient nodes in the particular class to determine a size of the portions of the file to be obtained by respective ones of the recipient nodes in the particular class.

19. A computer program product for transferring a file from a source node to a terminal node, the computer program product comprising a non-transitory storage medium storing instructions for execution by a terminal node for causing the terminal node to:

obtain capacity information concerning capacities of corresponding ones of a plurality of recipient nodes, wherein the capacity information includes available storage space in corresponding ones of the plurality of recipient nodes;

determine a corresponding portion of the file to be obtained by each of the recipient nodes according to the capacity information;

send a request from the terminal node to each of the plurality of recipient nodes to request transfer of the respective determined portion of the file from the source node;

receive, from the plurality of recipient nodes, respective portions of the file obtained by the respective recipient nodes from the source node; and assemble the portions of the file received from the plurality of recipient nodes at the terminal node.

20. The computer program product of claim 19, wherein the instructions when executed cause the terminal node to further:

identify multiple classes of the recipient nodes, where each class is dependent on the storage space of the recipient nodes in the respective class, and the network load of the recipient nodes in the respective class, wherein determining the corresponding portion of the file to be obtained by each of the recipient nodes comprises determining an aggregate portion of the file to be obtained by recipient nodes in a particular one of the multiple classes.

21. The computer program product of claim 20, wherein the instructions when executed by the terminal node cause the terminal node to further:

divide the aggregate portion by a number of the recipient nodes in the particular class to determine a size of the portions of the file to be obtained by respective ones of the recipient nodes in the particular class.

\* \* \* \* \*

UNITED STATES PATENT AND TRADEMARK OFFICE
CERTIFICATE OF CORRECTION

PATENT NO. : 8,341,285 B2  
APPLICATION NO. : 12/242714  
DATED : December 25, 2012  
INVENTOR(S) : Eshwar et al.

Page 1 of 1

It is certified that error appears in the above-identified patent and that said Letters Patent is hereby corrected as shown below:

In the Claims

In column 7, line 57, in Claim 2, after "method" delete "as claimed in".

Signed and Sealed this  
Twenty-second Day of October, 2013

Teresa Stanek Rea  
*Deputy Director of the United States Patent and Trademark Office*